United States Patent
Phillips et al.

(10) Patent No.: US 8,052,565 B2
(45) Date of Patent: Nov. 8, 2011

(54) EIGHT SPEED AUTOMATIC TRANSMISSION

(75) Inventors: Andrew W. Phillips, Saline, MI (US);
Scott H. Wittkopp, Ypsilanti, MI (US);
Clinton E. Carey, Monroe, MI (US);
James M. Hart, Belleville, MI (US);
Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 853 days.

(21) Appl. No.: 12/049,461

(22) Filed: Mar. 17, 2008

(65) Prior Publication Data

US 2008/0242475 A1    Oct. 2, 2008

Related U.S. Application Data

(60) Provisional application No. 60/909,284, filed on Mar. 30, 2007.

(51) Int. Cl.
*F16H 3/44*    (2006.01)
*F16H 3/62*    (2006.01)

(52) U.S. Cl. ......... 475/275; 475/286; 475/317; 475/323

(58) Field of Classification Search .......... 475/275–293, 475/303, 311–313, 317–319, 323–325
See application file for complete search history.

(56) References Cited

U.S. PATENT DOCUMENTS

| | | | |
|---|---|---|---|
| 6,176,803 B1 | 1/2001 | Meyer et al. | |
| 6,558,287 B2 | 5/2003 | Hayabuchi et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,163,484 B2 | 1/2007 | Klemen | |
| 7,452,303 B2 * | 11/2008 | Seo | 475/284 |
| 7,749,129 B2 * | 7/2010 | Wittkopp et al. | 475/296 |
| 7,766,784 B2 * | 8/2010 | Hart et al. | 475/275 |
| 7,798,932 B2 * | 9/2010 | Wittkopp et al. | 475/269 |
| 7,803,084 B2 * | 9/2010 | Phillips et al. | 475/317 |
| 7,811,197 B2 * | 10/2010 | Phillips et al. | 475/275 |
| 7,862,468 B2 * | 1/2011 | Phillips et al. | 475/277 |
| 2005/0090362 A1 | 4/2005 | Abe et al. | |
| 2006/0270513 A1 | 11/2006 | Klemen | |
| 2006/0270516 A1 | 11/2006 | Klemen | |

FOREIGN PATENT DOCUMENTS

DE    102008063533 A1 *    7/2010

* cited by examiner

*Primary Examiner* — Tisha Lewis

(57) ABSTRACT

An automatic transmission is provided having an input member, an output member, four planetary gear sets, a plurality of coupling members and a plurality of torque transmitting devices. Each of the planetary gear sets includes first, second and third members. The torque transmitting devices may be either clutches or brakes.

23 Claims, 3 Drawing Sheets

| GEAR STATE | GEAR RATIO | RATIO STEP | TORQUE TRANSMITTING DEVICES ||||| 
|---|---|---|---|---|---|---|---|
| | | | 34 | 26 | 28 | 30 | 32 |
| REV | -1.465 | | X | | | X | X |
| N | | -0.32 | O | | | | O |
| 1ST | 4.600 | | X | | X | | X |
| 2ND | 3.325 | 1.38 | X | X | | | X |
| 3RD | 2.200 | 1.51 | | X | X | | X |
| 4TH | 1.378 | 1.60 | | X | | X | X |
| 5TH | 1.000 | 1.38 | | | X | X | X |
| 6TH | 0.630 | 1.59 | | X | X | X | |
| 7TH | 0.543 | 1.16 | X | | X | X | |
| 8TH | 0.482 | 1.13 | X | X | | X | |

X = ON - ENGAGED CARRYING TORQUE
O = ON - ENGAGED NOT CARRYING TORQUE

| GEAR STATE | GEAR RATIO | RATIO STEP | TORQUE TRANSMITTING DEVICES ||||| 
|---|---|---|---|---|---|---|---|
| | | | 134 | 132 | 130 | 128 | 126 |
| REV | -1.692 | | X | X | X | | |
| N | | -0.39 | O | O | | | |
| 1ST | 4.375 | | X | X | | X | |
| 2ND | 2.939 | 1.49 | X | X | | | X |
| 3RD | 1.902 | 1.54 | | X | | X | X |
| 4TH | 1.570 | 1.21 | | X | X | | X |
| 5TH | 1.340 | 1.17 | | X | X | X | |
| 6TH | 1.000 | 1.34 | | | X | X | X |
| 7TH | 0.745 | 1.34 | X | | X | X | |
| 8TH | 0.623 | 1.20 | X | | X | | X |

X = ON - ENGAGED CARRYING TORQUE
O = ON - ENGAGED NOT CARRYING TORQUE

US 8,052,565 B2

EIGHT SPEED AUTOMATIC TRANSMISSION

CROSS-REFERENCE TO RELATED APPLICATIONS

This application claims the benefit of U.S. Provisional Application No. 60/909,284 filed on Mar. 30, 2007. The disclosure of the above application is incorporated herein by reference.

FIELD

The invention relates generally to a multiple speed automatic transmission having a plurality of planetary gear sets and a plurality of torque transmitting devices and more particularly to an eight speed automatic transmission having four planetary gear sets and a plurality of torque transmitting devices.

BACKGROUND

The statements in this section merely provide background information related to the present disclosure and may or may not constitute prior art.

A typical multiple speed automatic transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current automatic transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed automatic transmission.

SUMMARY

In an aspect of the present invention, a transmission is provided having an input member, an output member, first, second, third and fourth planetary gear sets each having first, second and third members. A first interconnecting member continuously interconnects the first member of the first planetary gear set with a stationary member. A second interconnecting member continuously interconnecting the second member of the first planetary gear set with the second member of the second planetary gear set. A third interconnecting member continuously interconnecting the first member of the second planetary gear set with the first member of the third planetary gear set. A fourth interconnecting member continuously interconnecting the third member of the second planetary gear set with the third member of the third planetary gear set. Five torque transmitting devices are selectively engageable to interconnect one of the first members, second members, and third members with at least one of the first members, second members, third members, and the stationary member. The torque transmitting devices are selectively engageable in combinations of at least three to establish at least eight forward speed ratios and at least one reverse speed ratio between the input member and the output member.

In another aspect of the present invention, the transmission includes four planetary gear sets, four clutches, and one brake.

In another aspect of the present invention, the first of the five torque transmitting devices is selectively engageable to interconnect third member of the first planetary gear set with the second member of the fourth planetary gear set.

In another aspect of the present invention, the second of the five torque transmitting devices is selectively engageable to interconnect at least one of the second member of the first planetary gear set and the second member of the second planetary gear set with the third member of the fourth planetary gear set.

In another aspect of the present invention, the third of the five torque transmitting devices is selectively engageable to interconnect the third member of the third planetary gear set with at least one of the first member of the fourth planetary gear set and the input member.

In another aspect of the present invention, the fourth of the five torque transmitting devices is selectively engageable to interconnect at least one of the first member of the second planetary gear and the first member of the third planetary gear with the third member of the fourth planetary gear set.

In another aspect of the present invention, the fifth of the five torque transmitting devices is selectively engageable to interconnect the second member of the fourth planetary gear set with the stationary member.

In another aspect of the present invention, the first members of the first and fourth planetary gear sets and the second members of the second and third planetary gear sets are sun gears, the third members of the first, second, third, and fourth planetary gear sets are carrier members, the second members of the first and fourth planetary gear sets and the first members of the second and third planetary gear sets are ring gears.

In another aspect of the present invention, the input member is continuously interconnected with the first member of the fourth planetary gear set and the output member is continuously interconnected with the second member of the third planetary gear set.

In another aspect of the present invention, the stationary member is a transmission housing.

In another aspect of the present invention, a transmission is provided having an input member, an output member, first, second, third and fourth planetary gear sets each having a sun gear, a carrier member, and a ring gear. The input member is continuously interconnected with the sun gear of the fourth planetary gear set and the output member is continuously interconnected with the ring gear of the third planetary gear set. A first interconnecting member continuously interconnects the sun gear of the first planetary gear set with a stationary member. A second interconnecting member continuously interconnects the carrier member of the first planetary gear set with the ring gear of the second planetary gear set. A third interconnecting member continuously interconnects the carrier member of the second planetary gear set with the carrier member of the third planetary gear set. A fourth interconnecting member continuously interconnects the sun gear of the second planetary gear set with the sun gear of the third planetary gear set. A first torque transmitting device is selectively engageable to interconnect at least one of the sun gear of the second planetary gear set and the sun gear of the third planetary gear set with the carrier member of the fourth planetary gear set. A second torque transmitting device is selectively engageable to interconnect at least one of the sun gear of the second planetary gear set and the sun gear of the third planetary gear set with the ring gear of the fourth planetary gear set. A third torque transmitting device is selectively engageable to interconnect the carrier member of the third planetary gear set with at least one of the sun gear of the fourth planetary gear set and the input member. A fourth torque transmitting device is selectively engageable to interconnect the ring gear of the first planetary gear with the ring gear of the fourth planetary gear set. A fifth torque transmitting device is selectively engageable to interconnect the carrier member of the fourth planetary gear set with the stationary member. The torque transmitting devices are selectively engageable in combinations of at least three to establish at least eight forward speed ratios and at least one reverse speed ratio between the input member and the output member.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the members of the four planetary gear sets. These permanent mechanical connections relate the transmission embodiments. More specifically, a first component or member of a first planetary gear set is permanently coupled to a ground, stationary member, or transmission housing. A second component or member of the first planetary gear set is permanently coupled to a second component or member of a second planetary gear set. A first component or member of the second planetary gear set is permanently coupled to a first component or member of a third planetary gear set. Finally, a third component or member of the second planetary gear set is permanently coupled to a third component or member of the third planetary gear set.

Figure 1:
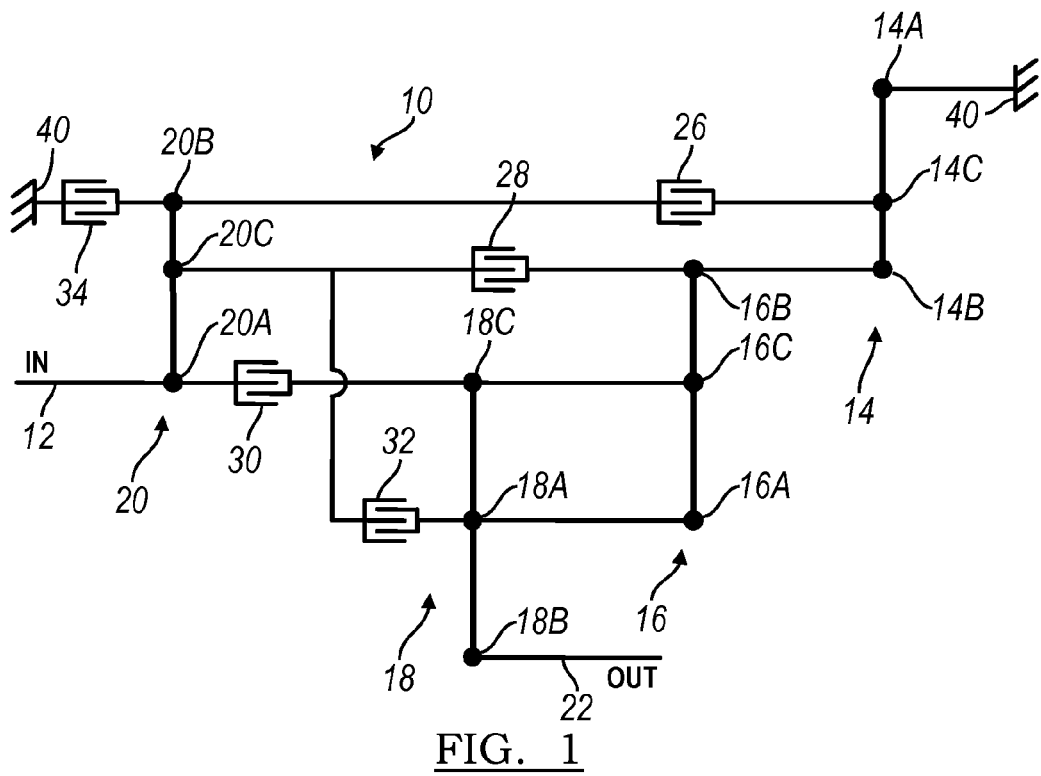
FIG. 1 is a lever diagram of a first embodiment of an eight speed automatic transmission according to the present invention.

Referring now to FIG. 1, a first embodiment of an eight speed automatic transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gearset. These lever ratios, in turn, are used to vary the gear ratios of the transmission in order to achieve an appropriate ratio and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising, which is hereby fully incorporated by reference.

The automatic transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C, and an output shaft or member 22.

The first node 14A of the first planetary gear set 14 is coupled to ground or transmission housing 40. The second node 14B of the first planetary gear set 14 is coupled to the second node 16B of the second planetary gear set 16. The first node 16A of the second planetary gear set 16 is coupled to the first node 18A of the third planetary gear set 18. The third node 16C of the second planetary gear set 16 is coupled to the third node 18C of the third planetary gear set 18.

The input shaft or member 12 is coupled to the first node 20A of the fourth planetary gear set 20. The output shaft or member 22 is coupled to the second node 18B of the third planetary gear set 18. A first clutch 26 selectively connects the third node 14C of the first planetary gear set 14 to the second node 20B of the fourth planetary gear set 20. A second clutch 28 selectively connects the second node 16B of the second planetary gear set 16 to the third node 20C of the fourth planetary gear set 20. A third clutch 30 selectively connects the third node 18C of the third planetary gear set 18 to the first node 20A of the fourth planetary gear set 20. A fourth clutch 32 selectively connects the first node 18A of the third planetary gear set 18 to a third node 20C of the fourth planetary gear set 20. Finally, a first brake 34 selectively connects the second node 20B of the fourth planetary gear set 20 to ground or transmission housing 40.

Figure 2:
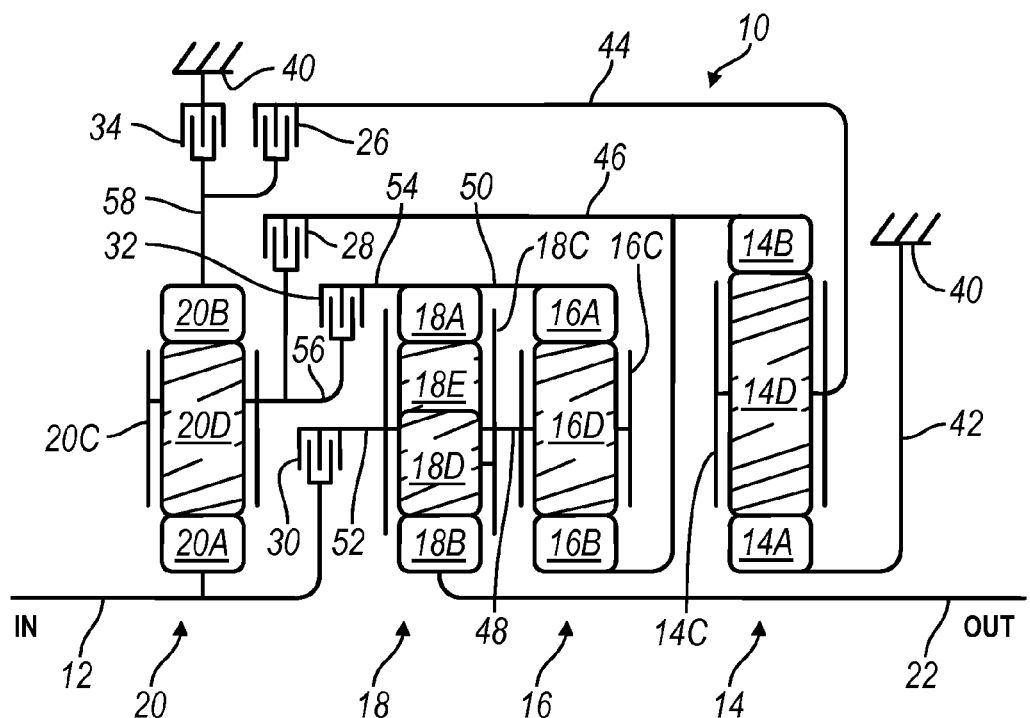
FIG. 2 is a diagrammatic view of the first embodiment of the eight speed automatic transmission according to the present invention.

Referring now to FIG. 2, a stick diagram presents a schematic layout of the first embodiment of the eight speed transmission 10 according to the present invention. In FIG. 2, the numbering from the lever diagram of FIG. 1 is carried over. The clutches, brakes and couplings are correspondingly presented whereas the nodes of the planetary gear sets now appear as components of planetary gear sets such a sun gears, ring gears, planet gears and planet gear carriers. More specifically, the first planetary gear set 14 includes a first sun gear 14A, a first ring gear 14B, and a first planet carrier 14C that includes a plurality of planet gears 14D rotatably disposed thereon. The first sun gear 14A is coupled to a first shaft or interconnecting member 42 that is permanently connected to ground or transmission housing 40. The first planet carrier 14C is coupled to a second shaft or interconnecting member 44. The first ring gear 14B is coupled to a third shaft or interconnecting member 46. Planet gears 14D are each configured to intermesh with both sun gear member 14A and ring gear member 14B.

The second planetary gear set 16 includes a second sun gear 16B, a second ring gear 16A, and a second planet carrier 16C that includes a plurality of planet gears 16D rotatably disposed thereon. The second sun gear 16B is coupled to the third interconnecting member 46. The second planet carrier 16C is coupled to a fourth shaft or interconnecting member 48. The second ring gear 16A is coupled to a fifth shaft or interconnecting member 50. Planet gears 16D are configured to intermesh with both sun gear member 16B and ring gear member 16A.

The third planetary gear set 18 includes a third sun gear 18B, a third ring gear 18A, and a third planet carrier 18C that includes a first plurality of planet gears 18D and a second plurality of planet gears 18E rotatably disposed thereon. The third sun gear 18B is coupled to and directly drives the output shaft or member 22. The third planet carrier 18C is coupled to the fourth interconnecting member 48 and a sixth shaft or interconnecting member 52. The third ring gear 18A is coupled to the fifth interconnecting member 50 and a seventh shaft or interconnecting member 54. First set of planet gears 18D are each configured to intermesh with both sun gear member 18B and second set of planet gears 18E. Second set of planet gears 18E are each configured to intermesh with both ring gear member 18A and first set of planet gears 18D.

The fourth planetary gear set 20 includes a fourth sun gear 20A, a fourth ring gear 20B, and a fourth planet carrier 20C that includes a plurality of planet gears 20D rotatably disposed The fourth sun gear 20A is coupled to and driven by the input shaft or member 12. The fourth planet carrier 20C is coupled to an eighth shaft or interconnecting member 56. The fourth ring gear 20B is coupled to a ninth shaft or interconnecting member 58. The planet gears 20D are each configured to intermesh with both fourth sun gear member 20A and fourth ring gear member 20B.

The first clutch 26 selectively couples the second interconnecting member 44 to the ninth interconnecting member 58. The second clutch 28 selectively couples the third interconnecting member 46 to the eighth interconnecting member 56. The third clutch 30 selectively couples the input shaft or member 12 to the sixth interconnecting member 52. The fourth clutch 32 selectively couples the eighth interconnecting member 56 to the seventh interconnecting member 54. The first brake 34 selectively couples the ninth interconnecting member 58 to ground or transmission housing 40.

Figures 3, 4:
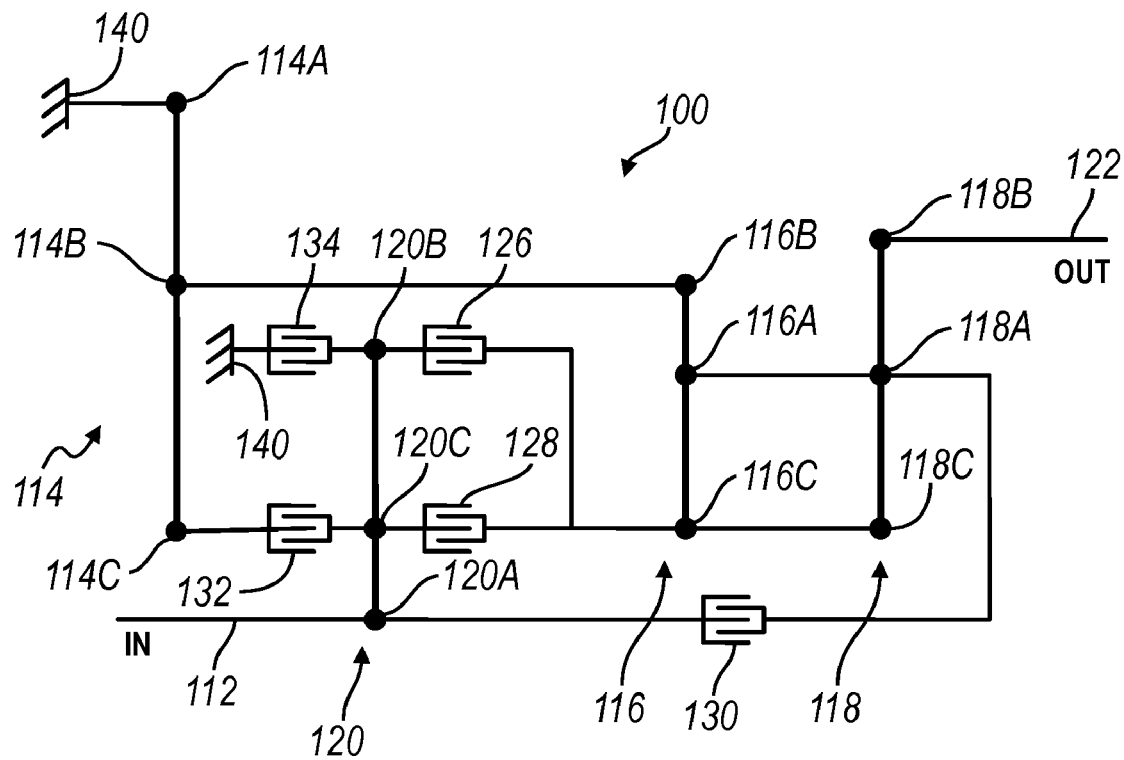
FIG. 3 is a truth table presenting the state of engagement of the various torque transmitting clutches and brakes in each of the available forward and reverse speeds or gear ratios of the automatic transmission illustrated in FIGS. 1 and 2.
FIG. 4 is a lever diagram of a second embodiment of an eight speed automatic transmission according to the present invention.

Referring now to FIGS. 2 and 3, the operation of the first embodiment of the eight speed automatic transmission 10 will be described. It will be appreciated that the automatic transmission 10 is capable of transmitting torque from the input shaft or member 12 to the output shaft or member 22 in eight forward speed or torque ratios and one reverse speed or torque ratio. Each forward and reverse speed or torque ratio is attained by engagement of one or more of the clutches or brakes as will be explained below. FIG. 3 is a truth table presenting the various combinations of clutches and brakes that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 10.

To establish ratios, three clutching elements are engaged for each gear state. The engaged clutches are represented by an "X" in each respective row. For example, to establish reverse gear, the first brake 34, the third clutch 30, and the fourth clutch 32 are engaged or activated. The first brake 34 selectively couples the ninth interconnecting member 58 to ground or transmission housing 40 thereby selectively fixing the fourth ring gear 20B from rotation. The third clutch 30 selectively couples the input shaft or member 12 to the sixth interconnecting member 52. The fourth clutch 32 selectively couples the eighth interconnecting member 56 to the seventh interconnecting member 54. Likewise, the eight forward ratios are achieved through different combinations of clutch engagement, as shown in FIG. 3.

It will be appreciated that the foregoing explanation of operation and gear states of the eight speed automatic transmission 10 assumes, first of all, that all clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Turning now to FIG. 4, a lever diagram for a second embodiment of an eight speed automatic transmission 100 is illustrated. The automatic transmission 100 includes an input shaft or member 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 118B and a third node 118C, a fourth planetary gear set 120 having three nodes: a first node 120A, a second node 120B and a third node 120C, and an output shaft or member 122.

The first node 114A of the first planetary gear set 114 is coupled to ground or a transmission housing 140. The second node 114B of the first planetary gear set 114 is coupled to the second node 116B of the second planetary gear set 116. The first node 116A of the second planetary gear set 116 is coupled to the first node 118A of the third planetary gear set 118. The third node 116C of the second planetary gear set 116 is coupled to the third node 118C of the third planetary gear set 118.

The input shaft or member 112 is coupled to the first node 120A of the fourth planetary gear set 120. The output shaft or member 122 is coupled to the second node 118B of the third planetary gear set 118. A first clutch 126 selectively connects the second node 120B of the fourth planetary gear set 120 to the third node 116C of the second planetary gear set 116. A second clutch 128 selectively connects the third node 120C of the fourth planetary gear set 120 to the third node 116C of the second planetary gear set 116. A third clutch 130 selectively connects the first node 120A of the fourth planetary gear set 120 to the first node 118A of the third planetary gear set 118. A fourth clutch 132 selectively connects the third node 114C of the first planetary gear set 114 to the third node 120C of the fourth planetary gear set 120. Finally, a first brake 134 selectively connects the second node 120B of the fourth planetary gear set to ground or transmission housing 140.

Figures 5, 6:
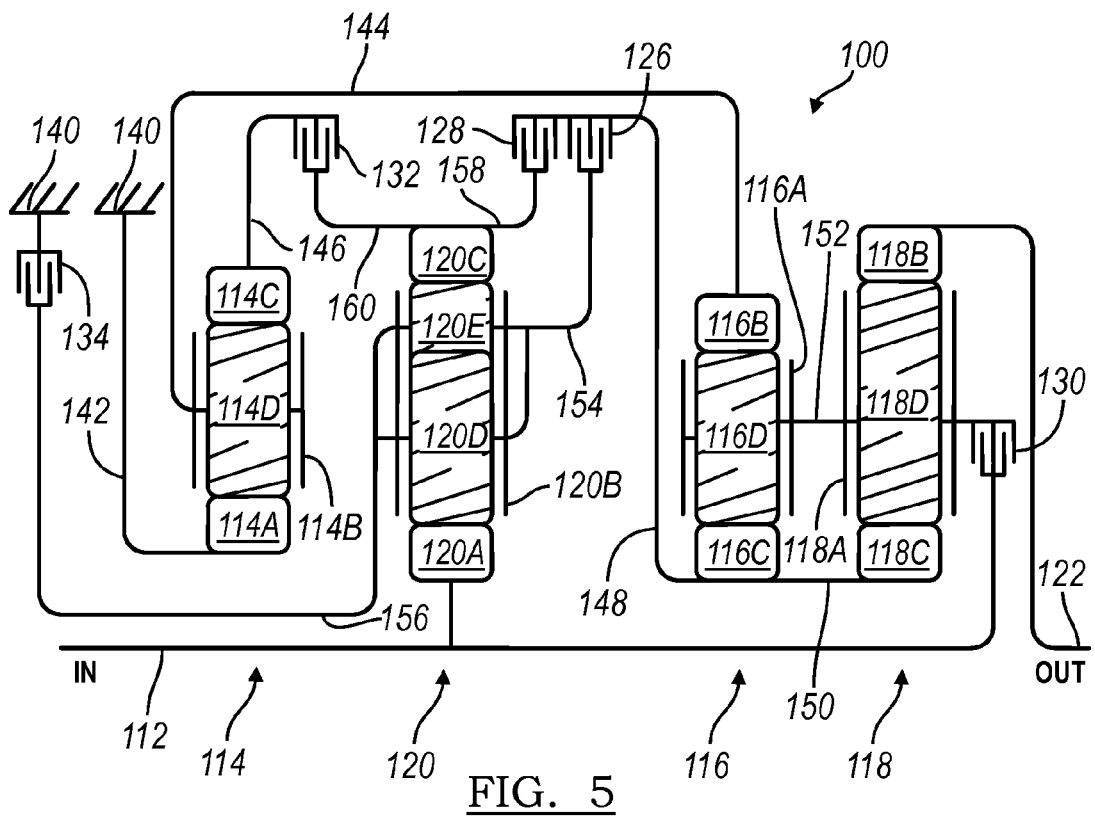
FIG. 5 is a diagrammatic view of the second embodiment of the eight speed automatic transmission according to the present invention.
FIG. 6 is a truth table presenting the state of engagement of the various torque transmitting clutches and brakes in each of the available forward and reverse speeds or gear ratios of the automatic transmission illustrated in FIGS. 4 and 5.

Referring now to FIG. 5, a stick diagram presents a schematic layout of the first embodiment of the eight speed transmission 100 according to the present invention. In FIG. 5, the numbering from the lever diagram of FIG. 4 is carried over. The clutches, brakes and couplings are correspondingly presented whereas the nodes of the planetary gear sets now appear as components of planetary gear sets such a sun gears, ring gears, planet gears and planet gear carriers. More specifically, the first planetary gear set 114 includes a first sun gear 114A, a first ring gear 114C, and a first planet carrier 114B that includes a plurality of planet gears 114D rotatably disposed thereon. The first sun gear 114A is coupled to a first shaft or interconnecting member 142 that is permanently connected to ground or the transmission housing 140. The first planet carrier 114B is coupled to a second shaft or interconnecting member 144. The first ring gear 114C is coupled to a third shaft or interconnecting member 146. Planet gears 114D are each configured to intermesh with both first sun gear member 114A and first ring gear member 114C.

The second planetary gear set 116 includes a second sun gear 116C, a second ring gear 116B, and a second planet carrier 116A that includes a plurality of planet gears 116D rotatably disposed thereon. The second sun gear 116C is coupled to a fourth shaft or interconnecting member 148 and to a fifth shaft or interconnecting member 150. The second planet carrier 116A is coupled to a sixth shaft or interconnecting member 152. The second ring gear 116B is coupled to the second interconnecting member 144. Planet gears 116D are each configured to intermesh with both second sun gear member 116C and second ring gear member 116B.

The third planetary gear set 118 includes a third sun gear 118C, a third ring gear 118B, and a third planet carrier 118A that includes a plurality of planet gears 118D rotatably disposed thereon. The third sun gear 118C is coupled to the fifth interconnecting member 150. The third planet carrier 118A is coupled to the sixth interconnecting member 152. The third ring gear 118B is coupled to and drives the output 122. Planet gears 118D are each configured to intermesh with both third sun gear member 118C and third ring gear member 118B.

The fourth planetary gear set 120 includes a fourth sun gear 120A, a fourth ring gear 120C, and a fourth planet carrier 120B that includes a first plurality of planet gears 120D and a second plurality of planet gears 120E rotatably disposed thereon. The fourth sun gear 120A is coupled to and driven by the input shaft or member 112. The fourth planet carrier 120B is coupled to a seventh shaft or interconnecting member 154 and to an eighth shaft or interconnecting member 156. The fourth ring gear 120C is coupled to a ninth shaft or interconnecting member 158 and to a tenth shaft or interconnecting member 160. First set of planet gears 120D are each configured to intermesh with both fourth sun gear member 120A and second set of planet gears 120E. Second set of planet gears 120E are each configured to intermesh with both the fourth ring gear member 120C and first set of planet gears 120D.

The first clutch 126 selectively couples the fourth interconnecting member 148 to the seventh interconnecting member 154. The second clutch 128 selectively couples the fourth interconnecting member 148 to the ninth interconnecting member 158. The third clutch 130 selectively couples the input shaft or member 112 to the third planet carrier 118A. The fourth clutch 132 selectively couples the tenth interconnecting member 160 to the third interconnecting member 146. The first brake 134 selectively couples the eighth interconnecting member 156 to ground or transmission housing 140.

Referring now to FIGS. 5 and 6, the operation of the second embodiment of the eight speed automatic transmission 100 will be described. It will be appreciated that the automatic transmission 100 is capable of transmitting torque from the input shaft or member 112 to the output shaft or member 122 in eight forward speed or torque ratios and one reverse speed or torque ratio. Each forward and reverse speed or torque ratio is attained by engagement of one or more of the clutches or brakes as will be explained below. FIG. 6 is a truth table presenting the various combinations of clutches and brakes that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 100.

To establish ratios, three clutching elements are engaged for each gear state. The engaged clutches are represented by an "X" in each respective row. For example, to establish reverse gear, the first brake 134, the third clutch 130, and the fourth clutch 132 are engaged or activated. The first brake 134 selectively couples the eighth interconnecting member 156 to ground or transmission housing 140. The third clutch 130 selectively couples the input shaft or member 112 to the third planet carrier 118A. The fourth clutch 132 selectively couples the tenth interconnecting member 160 to the third interconnecting member 146. Likewise, the eight forward ratios are achieved through different combinations of clutch engagement, as shown in FIG. 6.

It will be appreciated that the foregoing explanation of operation and gear states of the eight speed automatic transmission 100 assumes, first of all, that all clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
    an input member;
    an output member;
    first, second, third and fourth planetary gear sets each having first, second and third members;
    a first interconnecting member continuously interconnecting the first member of the first planetary gear set with a stationary member;
    a second interconnecting member continuously interconnecting the second member of the first planetary gear set with the second member of the second planetary gear set;
    a third interconnecting member continuously interconnecting the first member of the second planetary gear set with the first member of the third planetary gear set;
    a fourth interconnecting member continuously interconnecting the third member of the second planetary gear set with the third member of the third planetary gear set; and
    five torque transmitting devices each selectively engageable to interconnect at least one of the first members, second members, and third members with at least another one of the first members, second members, third members, and the stationary member; and
    wherein the torque transmitting devices are selectively engageable in combinations of at least three to establish at least eight forward speed ratios and at least one reverse speed ratio between the input member and the output member.

2. The transmission of claim 1 wherein a first of the five torque transmitting devices is selectively engageable to interconnect third member of the first planetary gear set with the second member of the fourth planetary gear set.

3. The transmission of claim 2 wherein a second of the five torque transmitting devices is selectively engageable to interconnect at least one of the second member of the first planetary gear set and the second member of the second planetary gear set with the third member of the fourth planetary gear set.

4. The transmission of claim 3 wherein a third of the five torque transmitting devices is selectively engageable to interconnect the third member of the third planetary gear set with at least one of the first member of the fourth planetary gear set and the input member.

5. The transmission of claim 4 wherein a fourth of the five torque transmitting devices is selectively engageable to interconnect at least one of the first member of the second planetary gear and the first member of the third planetary gear with the third member of the fourth planetary gear set.

6. The transmission of claim 5 wherein a fifth of the five torque transmitting devices is selectively engageable to interconnect the second member of the fourth planetary gear set with the stationary member.

7. The transmission of claim 1 wherein a first of the five torque transmitting devices is selectively engageable to interconnect at least one of the third member of the second planetary gear set and the third member of the third planetary gear set with the second member of the fourth planetary gear set.

8. The transmission of claim 7 wherein a second of the five torque transmitting devices is selectively engageable to interconnect at least one of the third member of the second planetary gear set and the third member of the third planetary gear set with the third member of the fourth planetary gear set.

9. The transmission of claim 8 wherein a third of the five torque transmitting devices is selectively engageable to interconnect the first member of the third planetary gear set with at least one of the first member of the fourth planetary gear set and the input member.

10. The transmission of claim 9 wherein a fourth of the five torque transmitting devices is selectively engageable to interconnect the third member of the first planetary gear with the third member of the fourth planetary gear set.

11. The transmission of claim 10 wherein a fifth of the five torque transmitting devices is selectively engageable to interconnect the second member of the fourth planetary gear set with the stationary member.

12. The transmission of claim 1 wherein the first members of the first and fourth planetary gear sets and the second members of the second and third planetary gear sets are sun gears, the third members of the first, second, third, and fourth planetary gear sets are carrier members, the second members of the first and fourth planetary gear sets and the first members of the second and third planetary gear sets are ring gears.

13. The transmission of claim 1 wherein the first members of the first and fourth planetary gear sets and the third members of the second and third planetary gear sets are sun gears, the second members of the first and fourth planetary gear sets and the first members of the second and third planetary gear sets are carrier members, the third members of the first and fourth planetary gear sets and the second members of the second and third planetary gear sets are ring gears.

14. The transmission of claim 1 wherein the input member is continuously interconnected with the first member of the fourth planetary gear set and the output member is continuously interconnected with the second member of the third planetary gear set.

15. The transmission of claim 1 wherein the stationary member is a transmission housing.

16. A transmission comprising:
an input member;
an output member;
first, second, third and fourth planetary gear sets each having first, second and third members, wherein the input member is continuously interconnected with the first member of the fourth planetary gear set and the output member is continuously interconnected with the second member of the third planetary gear set;
a first interconnecting member continuously interconnecting the first member of the first planetary gear set with a stationary member;
a second interconnecting member continuously interconnecting the second member of the first planetary gear set with the second member of the second planetary gear set;
a third interconnecting member continuously interconnecting the first member of the second planetary gear set with the first member of the third planetary gear set;
a fourth interconnecting member continuously interconnecting the third member of the second planetary gear set with the third member of the third planetary gear set;
a first torque transmitting device selectively engageable to interconnect third member of the first planetary gear set with the second member of the fourth planetary gear set;
a second torque transmitting device selectively engageable to interconnect at least one of the second member of the first planetary gear set and the second member of the second planetary gear set with the third member of the fourth planetary gear set;
a third torque transmitting device selectively engageable to interconnect the third member of the third planetary gear set with at least one of the first member of the fourth planetary gear set and the input member;
a fourth torque transmitting device selectively engageable to interconnect at least one of the first member of the second planetary gear and the first member of the third planetary gear with the third member of the fourth planetary gear set; and
a fifth torque transmitting device selectively engageable to interconnect the second member of the fourth planetary gear set with the stationary member, and
wherein the torque transmitting devices are selectively engageable in combinations of at least three to establish at least eight forward speed ratios and at least one reverse speed ratio between the input member and the output member.

17. The transmission of claim 16 wherein the first members of the first and fourth planetary gear sets and the second members of the second and third planetary gear sets are sun gears, the third members of the first, second, third, and fourth planetary gear sets are carrier members, the second members of the first and fourth planetary gear sets and the first members of the second and third planetary gear sets are ring gears.

18. The transmission of claim 16 wherein the stationary member is a transmission housing.

19. A transmission comprising:
an input member;
an output member;
first, second, third and fourth planetary gear sets each having first, second and third members, wherein the input member is continuously interconnected with the first member of the fourth planetary gear set and the output member is continuously interconnected with the second member of the third planetary gear set;
a first interconnecting member continuously interconnecting the first member of the first planetary gear set with a stationary member;
a second interconnecting member continuously interconnecting the second member of the first planetary gear set with the second member of the second planetary gear set;
a third interconnecting member continuously interconnecting the third member of the second planetary gear set with the third member of the third planetary gear set;

a fourth interconnecting member continuously interconnecting the first member of the second planetary gear set with the first member of the third planetary gear set;

a first torque transmitting device selectively engageable to interconnect at least one of the third member of the second planetary gear set and the third member of the third planetary gear set with the second member of the fourth planetary gear set;

a second torque transmitting device selectively engageable to interconnect at least one of the third member of the second planetary gear set and the third member of the third planetary gear set with the third member of the fourth planetary gear set;

a third torque transmitting device selectively engageable to interconnect the first member of the third planetary gear with at least one of the first member of the fourth planetary gear set and the input member;

a fourth torque transmitting device selectively engageable to interconnect the third member of the first planetary gear with the third member of the fourth planetary gear set; and a fifth torque transmitting device selectively engageable to interconnect the second member of the fourth planetary gear set with the stationary member, and wherein the torque transmitting devices are selectively engageable in combinations of at least three to establish at least eight forward speed ratios and at least one reverse speed ratio between the input member and the output member.

20. The transmission of claim 19 wherein the first members of the first and fourth planetary gear sets and the third members of the second and third planetary gear sets are sun gears, the second members of the first and fourth planetary gear sets and the first members of the second and third planetary gear sets are carrier members, the third members of the first and fourth planetary gear sets and the second members of the second and third planetary gear sets are ring gears.

21. The transmission of claim 19 wherein the stationary member is a transmission housing.

22. A transmission comprising:
an input member;
an output member;
first, second, third and fourth planetary gear sets each having a sun gear, a carrier member, and a ring gear, wherein the input member is continuously interconnected with the sun gear of the fourth planetary gear set and the output member is continuously interconnected with the sun gear of the third planetary gear set;

a first interconnecting member continuously interconnecting the sun gear of the first planetary gear set with a stationary member;

a second interconnecting member continuously interconnecting the ring member of the first planetary gear set with the sun member of the second planetary gear set;

a third interconnecting member continuously interconnecting the ring member of the second planetary gear set with the ring member of the third planetary gear set;

a fourth interconnecting member continuously interconnecting the carrier member of the second planetary gear set with the carrier member of the third planetary gear set;

a first torque transmitting device selectively engageable to interconnect carrier member of the first planetary gear set with the ring member of the fourth planetary gear set;

a second torque transmitting device selectively engageable to interconnect at least one of the ring gear of the first planetary gear set and the sun gear of the second planetary gear set with the carrier member of the fourth planetary gear set;

a third torque transmitting device selectively engageable to interconnect the carrier member of the third planetary gear set with at least one of the sun gear of the fourth planetary gear set and the input member;

a fourth torque transmitting device selectively engageable to interconnect the carrier member of the fourth planetary gear with at least one of the ring gear of the second planetary gear and the ring gear of the third planetary gear; and a fifth torque transmitting device selectively engageable to interconnect the ring gear of the fourth planetary gear set with the stationary member, and wherein the torque transmitting devices are selectively engageable in combinations of at least three to establish at least eight forward speed ratios and at least one reverse speed ratio between the input member and the output member.

23. A transmission comprising:
an input member;
an output member;
first, second, third and fourth planetary gear sets each having a sun gear, a carrier member, and a ring gear, wherein the input member is continuously interconnected with the sun gear of the fourth planetary gear set and the output member is continuously interconnected with the ring gear of the third planetary gear set;

a first interconnecting member continuously interconnecting the sun gear of the first planetary gear set with a stationary member;

a second interconnecting member continuously interconnecting the carrier member of the first planetary gear set with the ring gear of the second planetary gear set;

a third interconnecting member continuously interconnecting the carrier member of the second planetary gear set with the carrier member of the third planetary gear set;

a fourth interconnecting member continuously interconnecting the sun gear of the second planetary gear set with the sun gear of the third planetary gear set;

a first torque transmitting device selectively engageable to interconnect at least one of the sun gear of the second planetary gear set and the sun gear of the third planetary gear set with the carrier member of the fourth planetary gear set;

a second torque transmitting device selectively engageable to interconnect at least one of the sun gear of the second planetary gear set and the sun gear of the third planetary gear set with the ring gear of the fourth planetary gear set;

a third torque transmitting device selectively engageable to interconnect the carrier member of the third planetary gear set with at least one of the sun gear of the fourth planetary gear set and the input member;

a fourth torque transmitting device selectively engageable to interconnect the ring gear of the first planetary gear with the ring gear of the fourth planetary gear set; and a fifth torque transmitting device selectively engageable to interconnect the carrier member of the fourth planetary gear set with the stationary member, and wherein the torque transmitting devices are selectively engageable in combinations of at least three to establish at least eight forward speed ratios and at least one reverse speed ratio between the input member and the output member.

* * * * *